(12) United States Patent
Liu

(10) Patent No.: US 12,094,197 B2
(45) Date of Patent: Sep. 17, 2024

(54) EXTRANEOUS CONTENT REMOVAL FROM IMAGES OF A SCENE CAPTURED BY A MULTI-DRONE SWARM

(71) Applicants: Sony Group Corporation, Tokyo (JP); Sony Corporation of America, New York, NY (US)

(72) Inventor: Cheng-Yi Liu, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 291 days.

(21) Appl. No.: 17/344,659

(22) Filed: Jun. 10, 2021

(65) Prior Publication Data

US 2022/0398395 A1    Dec. 15, 2022

(51) Int. Cl.
| | | |
|---|---|---|
| G06V 20/13 | (2022.01) | |
| B64C 39/02 | (2023.01) | |
| G06F 18/214 | (2023.01) | |
| G06V 10/25 | (2022.01) | |
| B64U 101/30 | (2023.01) | |

(52) U.S. Cl.
CPC ............ *G06V 20/13* (2022.01); *B64C 39/024* (2013.01); *G06F 18/214* (2023.01); *G06V 10/25* (2022.01); *B64U 2101/30* (2023.01)

(58) Field of Classification Search
CPC ...... G06V 20/13; G06V 10/25; B64C 39/024; G06F 18/214; B64U 2101/30; G06T 11/00; G06T 2207/10016; G06T 2207/10032; G06T 2207/20081; G06T 2207/30252; G06T 5/005
See application file for complete search history.

(56) References Cited

U.S. PATENT DOCUMENTS

| | | | |
|---|---|---|---|
| 2015/0363940 A1* | 12/2015 | Held | G06T 7/207 382/107 |
| 2018/0129882 A1* | 5/2018 | Seeber | G06T 7/11 |

(Continued)

OTHER PUBLICATIONS

Zhou Xin et al: "EGO-Swarm: A Fully Autonomous and Decentralized Quadrotor Swarm System in Cluttered Environments", 2021 IEEE International Conference on Robotics and Automation (ICRA), IEEE, May 30, 2021 (May 30, 2021), pp. 4101-4107, XP033989691, DOI: 10.1109/ICRA48506.2021.9561902.

(Continued)

*Primary Examiner* — Dale W Hilgendorf
*Assistant Examiner* — Frank T Glenn, III
(74) *Attorney, Agent, or Firm* — Trellis IP Law Group, PC

(57) ABSTRACT

A method for removing extraneous content in a first plurality of images, captured at a corresponding plurality of poses and a corresponding first plurality of times, by a first drone, of a scene in which a second drone is present includes the following steps, for each of the first plurality of captured images. The first drone predicts a 3D position of the second drone at a time of capture of that image. The first drone defines, in an image plane corresponding to that captured image, a region of interest (ROI) including a projection of the predicted 3D position of the second drone at a time of capture of that image. A drone mask for the second drone is generated, and then applied to the defined ROI, to generate an output image free of extraneous content contributed by the second drone.

15 Claims, 8 Drawing Sheets

(56) References Cited

U.S. PATENT DOCUMENTS

| | | | | |
|---|---|---|---|---|
| 2018/0329020 | A1* | 11/2018 | Hafizovic | G01S 5/20 |
| 2019/0049945 | A1* | 2/2019 | Moeller | H04N 23/64 |
| 2019/0103032 | A1* | 4/2019 | Sasaki | G08G 5/0034 |
| 2019/0156684 | A1* | 5/2019 | Pohl | G06T 7/50 |
| 2019/0355145 | A1* | 11/2019 | Bruner | H04W 4/38 |
| 2021/0383270 | A1* | 12/2021 | Moro, Jr. | B64C 39/024 |

OTHER PUBLICATIONS

Hirabayashi Manato et al: "Flying object detection system using an omnidirectional camera", Forensic Science International: Digital Investigation, Elsevier, Amsterdam, NL, vol. 35, Sep. 29, 2020 (Sep. 29, 2020), XP086409151, ISSN: 2666-2817, DOI: 10.1016/J.FSIDI.2020.301027.

\* cited by examiner

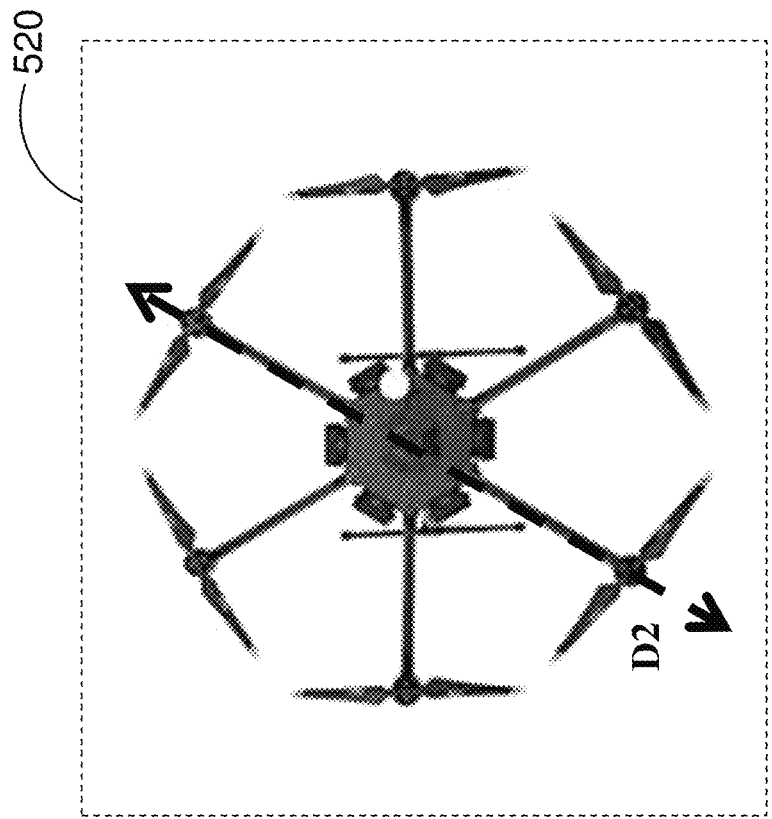
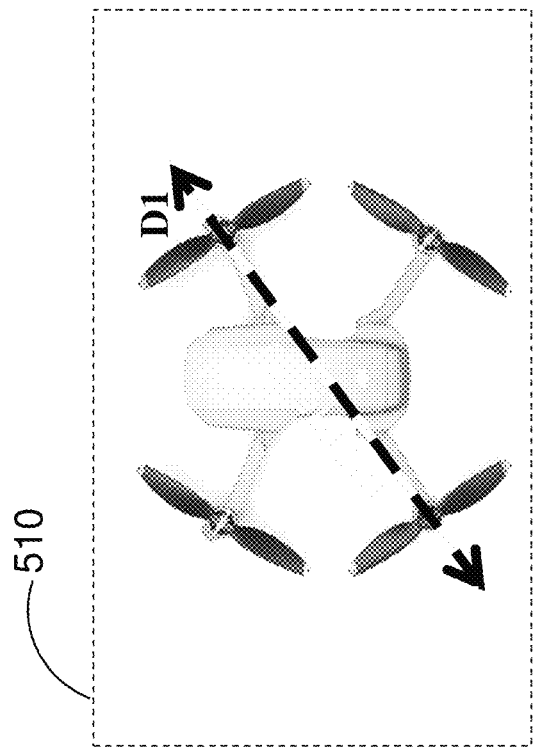
Figure 5

EXTRANEOUS CONTENT REMOVAL FROM IMAGES OF A SCENE CAPTURED BY A MULTI-DRONE SWARM

CROSS REFERENCES TO RELATED APPLICATIONS

This application is related to the following applications, U.S. patent application Ser. No. 16/917,013, entitled SYSTEM OF MULTI-DRONE VISUAL CONTENT CAPTURING, filed on Jun. 30, 2020 (020699-116500US) and U.S. patent application Ser. No. 16/917,671, entitled METHOD OF MULTI-DRONE CAMERA CONTROL, filed on Jun. 30, 2020 (020699-117000US), which are hereby incorporated by reference as if set forth in full in this application for all purposes.

BACKGROUND

A large-scale 3D scene may be much more efficiently reconstructed from captured images if a swarm of drones, rather than just a single drone, is used to capture multiple image streams over the same time period, but the presence of multiple drones, each following their own trajectory over the scene, creates the possibility that one or more images captured by any one drone will include visual content corresponding to one or more of the other drones, that happened to be in the field of view at the moment of image capture. This extraneous content, which provides no useful information on the scene of interest being captured, may show a portion or the entirety of one or more of the other drones. Even if all the drone trajectories and drone poses are very tightly controlled, some of the images in the image streams captured will almost inevitably include such content.

The presence of this content causes problems when the image streams are subsequently processed to reconstruct the scene, whether in 2D or 3D. One problem is that visual features extracted from image pixels showing drones in motion violate the assumption of static points, which is the basis of schemes for accurately aligning images. Another problem is that after alignment, and during 3D re-projection of rays captured by different drones, there will be a mixing of drone and scene textures, leading to low quality, incomplete reconstruction of the actual scene, due to inconsistent color data of rays projected from different drones during image reconstruction. It should be noted that similar problems will arise if extraneous objects other than drones are present, although for simplicity, this disclosure focusses primarily on the particular case of drones.

Current approaches to addressing these problems typically rely on manual frame-by-frame editing of the captured images. This is clearly a time consuming and laborious process, incurring cost. Moreover, even more automatic methods comprising visual content detection and removal are based purely on the visual information, and restricted to the boundaries of the individual images. In cases where the visually "interfering" drone is only partially within the field of view, so that it is "cropped", typical detection algorithms may be ineffective.

There is therefore a need for improved methods of eliminating extraneous, content, particularly "other drone"-related, from images captured by a given drone. Ideally, the methods would operate automatically, but would not make high demands on computer memory or processing power, either within the drones themselves, or at a ground control station involved in trajectory control, or in the post-processing stages of image processing.

Similar methods may also be useful for situations where the extraneous objects present in captured images are not other drones, but nevertheless should preferably be "erased" from the images before alignment and scene reconstruction processes are carried out. One example of such an object is a drone pilot or other observer, whose presence may be helpful or even required for flight safety, but who is captured in images of the scene. If such objects were equipped and measured as required of the drones in the present invention, they too could be automatically removed (on the basis of their own ROIs and masks) from the captured visual images. Similarly, instead of a second capturing drone, a person holding a camera may be the extraneous object. The present invention is also applicable in a situation where the flexibility of a "multiple crane shot" is necessary to conveniently capture multiple perspectives, and at least part of one or more cranes may be visible in shots captured by another

SUMMARY

Embodiments generally relate to systems and methods for removing extraneous content in images captured by one drone, of a scene in which other drones or other extraneous objects are present. In one embodiment, a method for removing extraneous content in a first plurality of images, captured at a corresponding plurality of poses and a corresponding first plurality of times, by a first drone, of a scene in which a second drone is present times, comprises, for each of the first plurality of captured images, the following steps: the first drone predicts a 3D position of the second drone at a time of capture of that image; the first drone defines, in an image plane corresponding to that captured image, a region of interest (ROI) including a projection of the predicted 3D position of the second drone at a time of capture of that image; a drone mask for the second drone is generated; and then that drone mask is applied to the defined ROI, to generate an output image free of extraneous content contributed by the second drone.

In another embodiment, a method for removing extraneous content in a first plurality of images, captured at a corresponding plurality of poses and a corresponding first plurality of times, by a first drone of a scene drone, of a scene in which a plurality of other drones is present, comprises, for each of the first plurality of captured images, the following steps: the first drone predicts a 3D position of each of the other drones at a time of capture of that image; the first drone defines, in an image plane corresponding to that captured image, a region of interest (ROI) for each of the other drones including a projection of the predicted 3D position of each of the other drones; a drone mask is generated for each of the other drones; and those drone masks are then applied to the corresponding defined ROIs, to generate an output image of the scene free of extraneous content contributed by those other drones.

In yet another embodiment, an apparatus for removing extraneous content in a first plurality of images, captured at a corresponding plurality of poses and a corresponding first plurality of times, by a first drone, of a scene in which a second drone is present comprises: one or more processors; and logic encoded in one or more non-transitory media for execution by the one or more processors and when executed operable to carry out the following steps for each of the first plurality of captured images: predicting a 3D position of the second drone at a time of capture of that image; defining, in an image plane corresponding to that captured image, a region of interest (ROI) including a projection of the predicted 3D position of the second drone at a time of capture of that image; generating a drone mask for the second drone; and applying the generated drone mask to the defined ROI, to generate an output image of the scene free of any extraneous content contributed by the second drone; wherein the prediction and the defining are carried out by one or more of the one or more processors located within the first drone; and wherein the drone mask generation and application are at least partly carried out by one or more processors located remotely from the first drone.

BRIEF DESCRIPTION OF THE DRAWINGS

FIG. 5 illustrates determination of effective drone diameters, required to implement embodiments of the present invention.

DETAILED DESCRIPTION OF EMBODIMENTS

A further understanding of the nature and the advantages of particular embodiments disclosed herein may be realized by reference to the remaining portions of the specification and the attached drawings.

Figure 1:
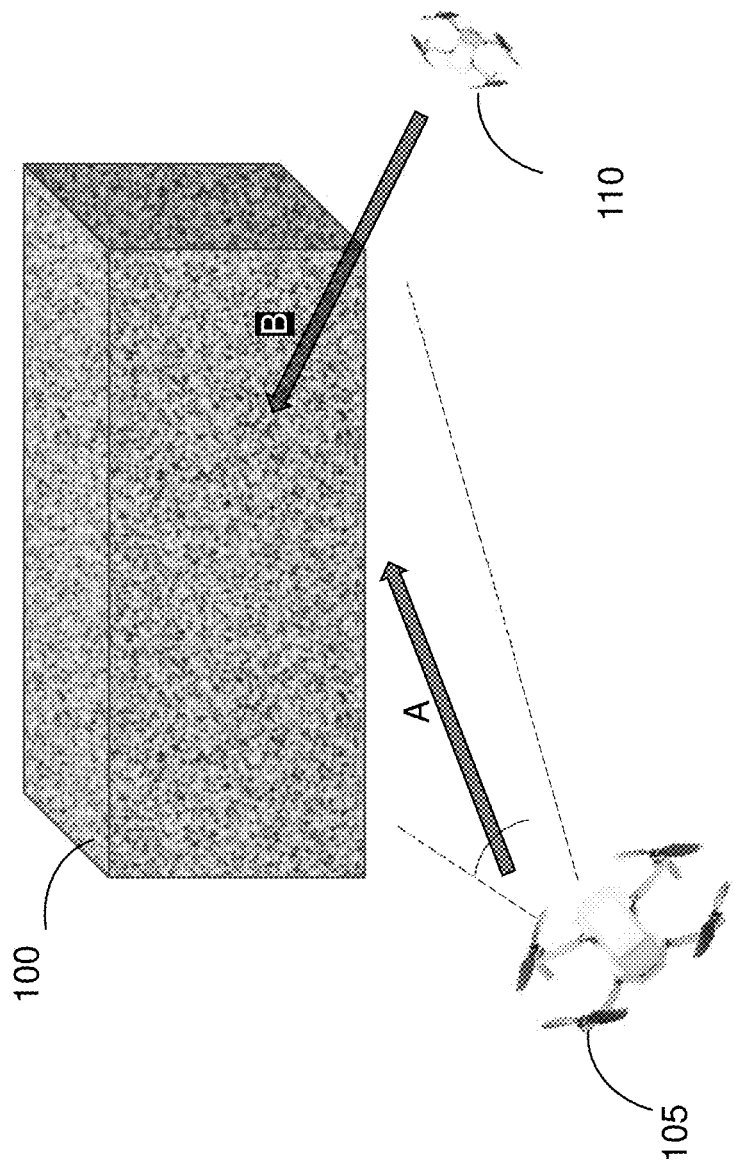
FIG. 1 illustrates a scenario in which a captured image includes extraneous content that may be removed using embodiments of the present invention.

FIG. 1 illustrates how the problems addressed by the present invention in ways to be described below may arise. The figure is a schematic depiction illustrating a three-dimensional scene of interest, represented by block 100. A first drone 105 is following a trajectory indicated by arrow A while capturing images of 100. Meanwhile, a second image-capturing drone 110 is following a trajectory indicated by arrow B, closer to the target scene 100, and viewing it from a different series of viewpoints. At the moment depicted in the figure, drone 110 is clearly about to enter the field of view of drone 105, and it may therefore be imaged in one or more of the images of scene 100 captured by 105.

Figure 2:
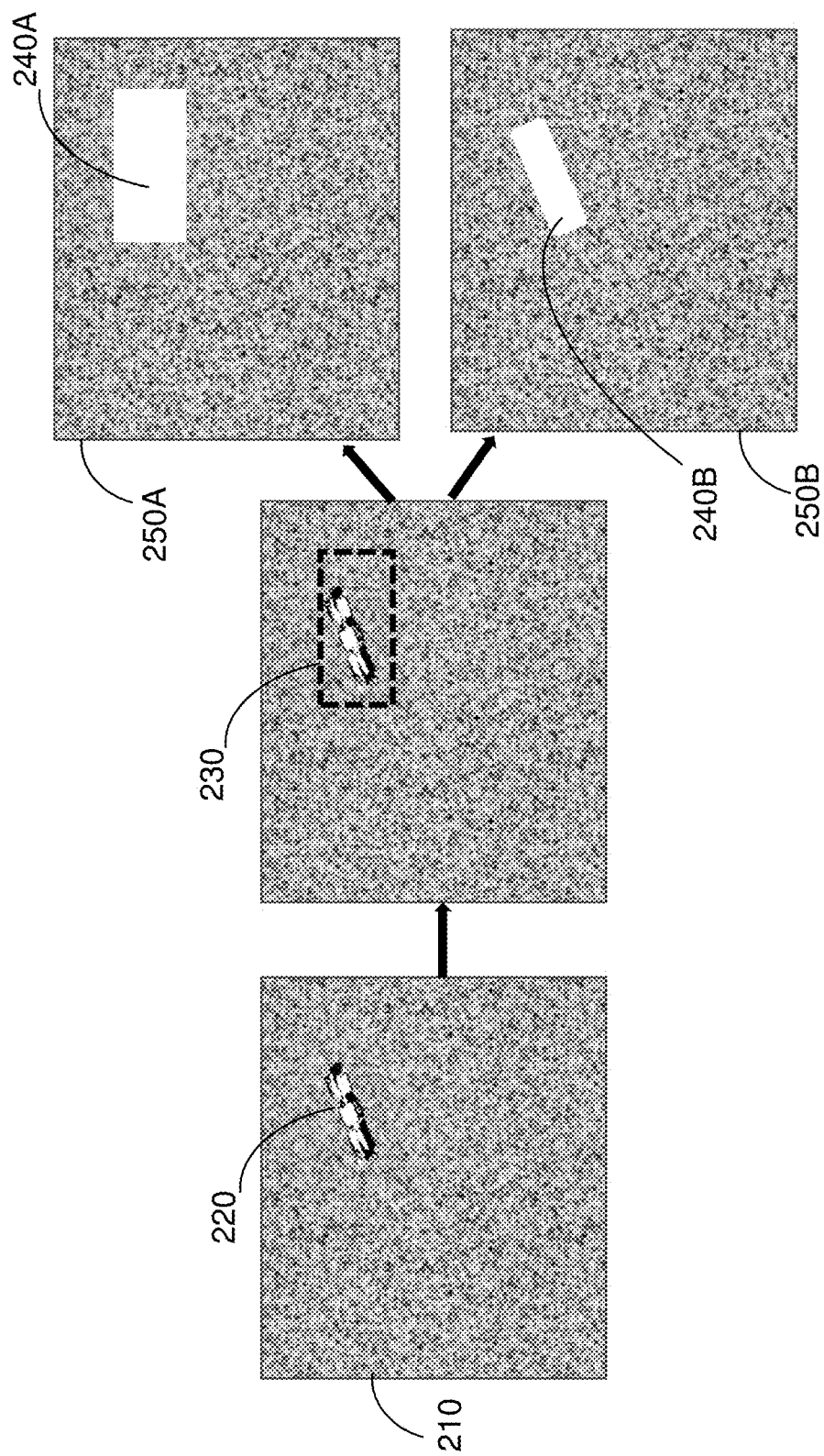
FIG. 2 illustrates effects of steps of a method according to embodiments of the present invention.

FIG. 2 shows an exemplary two-dimensional image 210 captured by a drone such as drone 105 in FIG. 1. Image 210 includes pixels with content representative of the scene of interest, shown here as a mottled grey pattern, but also a region 220 of pixels with content representative of another drone, such as drone 110 in FIG. 1. As will be described in greater detail below, embodiments of the present invention may be used to operate on image 210, defining a region of interest (ROI) 230 around the suspect pixels, and creating a mask to selectively remove their content. In the case shown at the upper right, a simple approach is to apply a mask 240A that exactly matches ROI 230, to blank out all the pixels corresponding to 220 but also surrounding pixels extending to the boundaries of ROI 230. The result is masked image 250A. In the case shown at the lower right, a more refined mask 240B is used, that takes advantage of a learning-based method to be described below. All the pixels corresponding to 220 are blanked out as before, but this time, fewer of the surrounding pixels are, allowing more of the scene itself to be seen in the masked image 250B.

Figure 3:
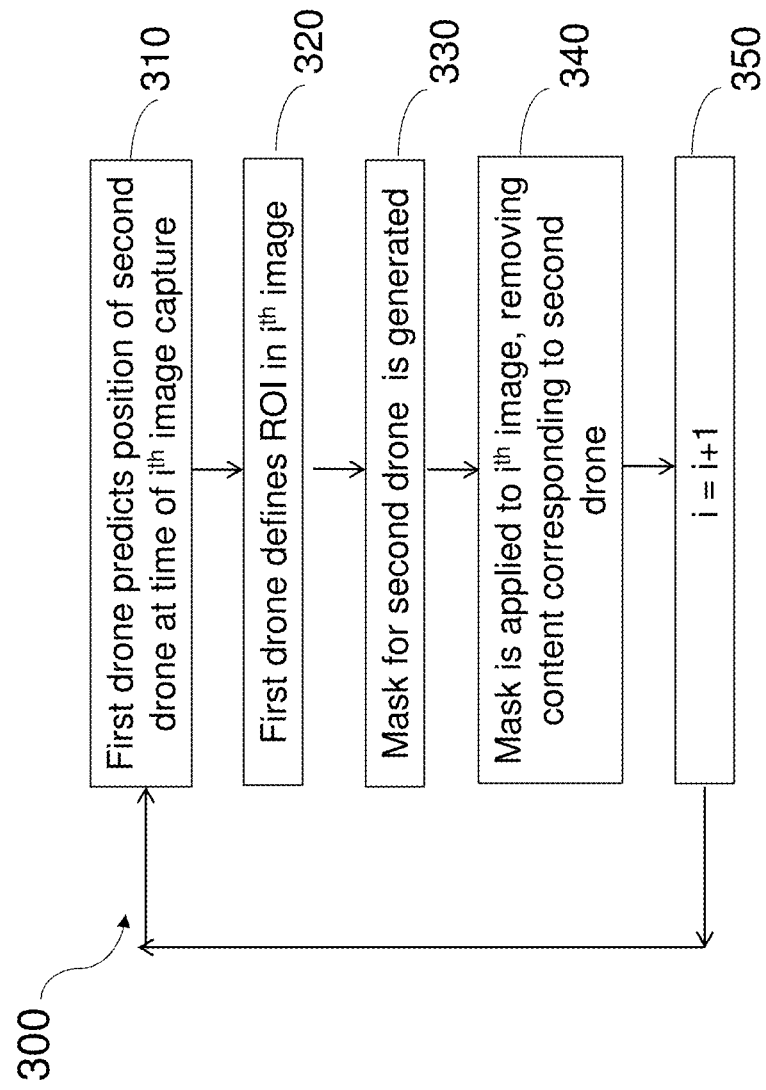
FIG. 3 is a flowchart of a method according to some embodiments of the present invention.

FIG. 3 is a flowchart of a method 300 for removing extraneous content in each image of a stream of drone-captured images, each image being captured at a particular time and at a particular drone pose, according to some embodiments of the present invention. It should be noted that while is assumed for simplicity in the bulk of this disclosure that the pose (position and orientation) of a drone fully defines the pose of the camera on that drone, in accordance with known calibration factors, of course in the most general case, the two poses (particularly orientation) need not be exactly the same, and the drone camera pose is actually the pose that matters for the issues of interest to the present invention, although it may be referred to herein simply as "drone pose" for convenience.

At step 310, a first drone predicts a 3D position of a second drone at a time of capture of an $i^{th}$ image captured by the camera on the first drone is predicted. At step 320, a projection of that predicted position is made onto the image plane corresponding to the captured image to define a region of interest, ROI, in that image plane. These two steps are carried out by the first drone, normally while it is still in flight, as the computing resources required are modest, and can readily be provided by one or more on-drone processors, allowing rapid frame-by-frame processing to occur.

At step 330, a mask for the second drone is generated. At step 340, the generated drone mask is applied to the defined ROI, to generate an output image free of extraneous content contributed by the second drone. At step 350, the index "i" is incremented and the method loops back to step 310. In applications demanding very high visual quality, such as movie capturing or the aerial inspection of construction sites for example, the generation and application of the mask are best performed offline, possibly at a studio or "post-processing" location where greater computational power can be provided, but some less demanding applications in augmented reality or virtual reality (AR/VR) may be satisfied with on-drone mask generation. In these cases, the mask shape will generally be coded and transmitted for post-processing location as an image.

Initialization of "i" as 1, and termination of the method when no more images remain to be processed, have been omitted from the flowchart in FIG. 1 for simplicity.

Aspects of step 310 will now be considered in more detail. A key feature of many embodiments of the present invention is the use of sensors other than cameras to provide real time 3D positioning information about the second drone to the first drone. This is a significant advantage over prior art methods, that have relied on the second drone accurately following a previously planned trajectory, relative to the first drone or in an absolute sense. In embodiments of the present invention, whether an initial position of the second drone is established a priori or by real time measurement, subsequent estimates of second drone position will be continuously updated according to subsequently received real time measurement data.

There are several established 3D global positioning methods that may be used to provide the real time positioning data, including GNSS, RTK-GNSS, and RTK-GNSS-IMU. Data from other sensors such as LIDAR and RADAR may provide additional accuracy. In some cases, the data may be transmitted directly from the second drone to the first drone, optionally using a 5G communication protocol; in others, it may be transmitted indirectly via a ground control station or a "master" drone. Other data generation and transmission options will be apparent to those of skill in the art. The positioning data must be time-stamped, of course, to enable the positions of the second drone at the times of image capture by the first drone to be estimated.

The position estimation, based on the sequentially received time-stamped data pertaining to the second drone, can involve the use of models such as simple $1^{st}$ order or $2^{nd}$ order interpolation/extrapolation, spline trajectory fitting, filter-based predictors, such as the Kalman filter and its variants, or sequential regression models such as RNNs and its variants trained by real trajectories of drones similar to the second drone. Prior knowledge of planned drone trajectories may be helpful as an additional constraint. The net result in each case is a 3D position estimation in the global coordinate system.

Aspects of step 320, involving the projection of the predicted 3D position onto the 2D image plane so that a surrounding area may then be established around that, to define the ROI, will now be considered in more detail.

Figure 4:
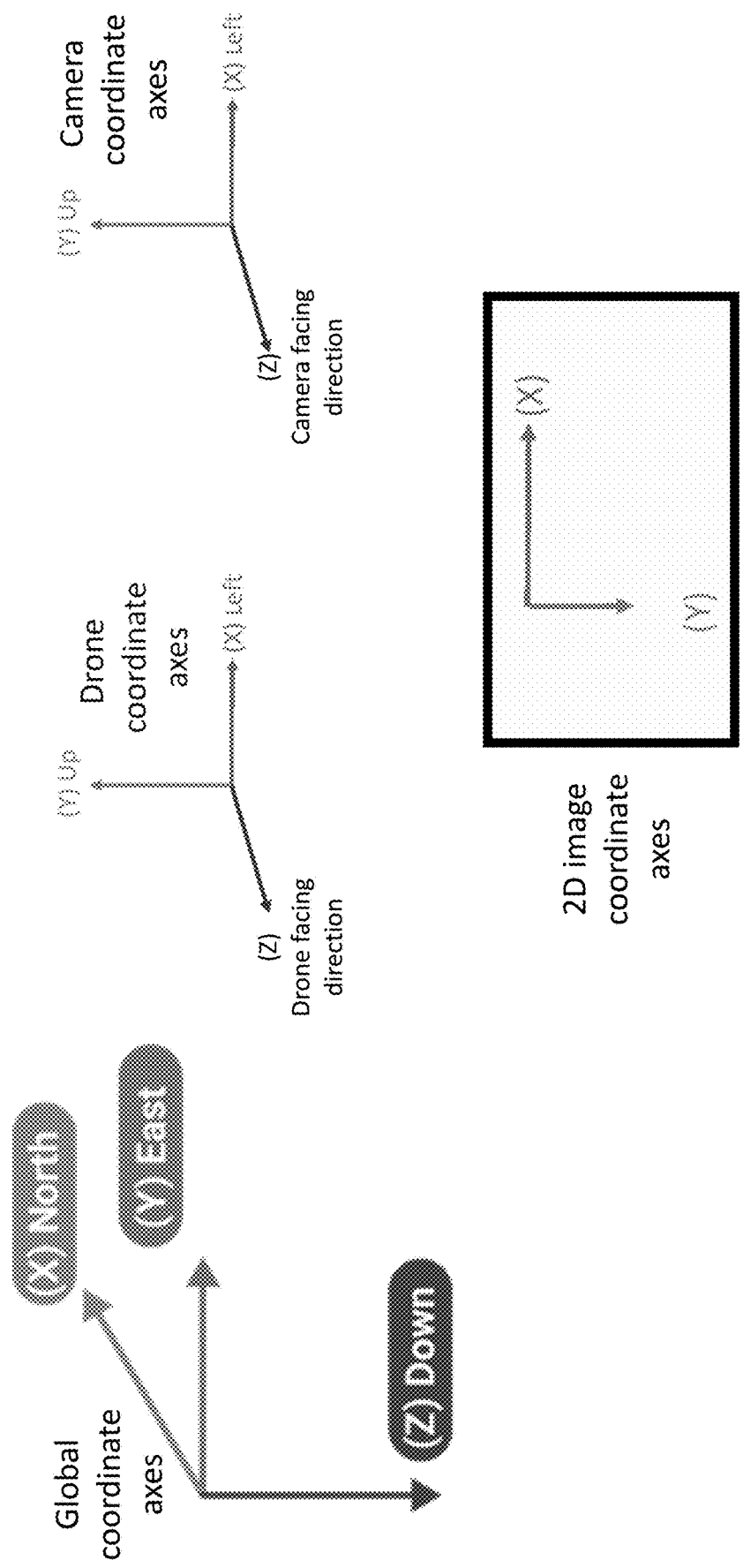
FIG. 4 illustrates relationships between coordinate axes systems relevant to implementation of embodiments of the present invention.

For each captured image, the first drone needs to know its own pose—3D position and 3D orientation—at the time of image capture. This is provided by real-time measurements, preferably provided by an RTK-GNSS-IMU system. An adequate measurement frequency for such measurements is typically 10 Hz or more. This data allows the first drone to compute the orientation of the captured image in a global 3D coordinate system. FIG. 4 illustrates the relationships between the various coordinate systems of interest in an exemplary case. The axes on the left of the figure are those for a global coordinate system, in this case a "North-East-Down" or "NED" system. The directions of the axes for the drone camera are shown in the right of the figure as being the same as those for the drone itself, in the center. As mentioned above, this equivalence need not always be the case, but it is assumed here for simplicity. At the lower part of the figure, the 2D axes characterizing the captured image are shown.

The intrinsic parameters (such as focal length, sensor size etc) of the camera on the first drone are assumed to be known, as they determine the relationships between positions in the real 3D world and positions in the 2D image captured by that camera. A projective camera model is assumed.

The first drone also needs information on the physical dimensions of the second drone, which is normally determined offline, prior to drone deployment. At the very least, this information must include the maximum span of the second drone when viewed from an orientation at which it appears at its largest; this is generally when viewed from directly above or below, while in flight. FIG. 5 illustrates a couple of examples, where parameters D1 and D2 may be taken as generous estimates (shown exaggerated in the figure for clarity) of the maximum diameters that could be perceived of drones 510 and 520 respectively.

Figure 6:
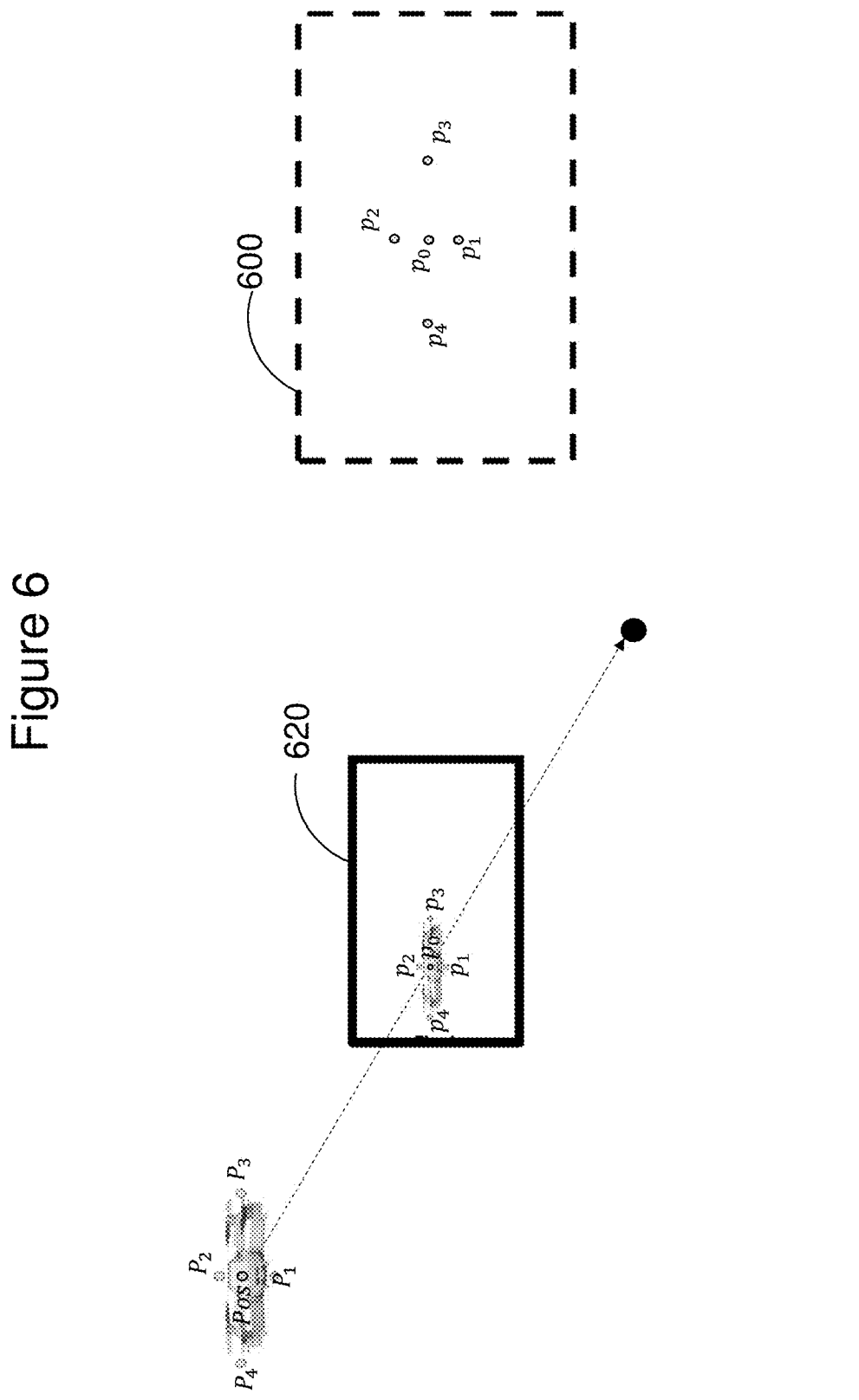
FIG. 6 illustrates some steps involved in determining a region of interest according to embodiments of the present invention.

FIG. 6 is an overview of how processing may then be performed by the first drone, using the data on its own pose, its own intrinsic characteristics, the estimated global 3D position $P_{os}$ of the second drone and the known dimensions of the second drone to calculate four maximal span points characterizing the maximal span of the second drone as seen by the first drone, first as $P_1$, $P_2$, $P_3$ and $P_4$ in the global coordinate system as shown in the upper left of the figure, then projected onto the 2D image plane, as $p_1$, $p_2$, $p_3$, and $p_4$ (around the corresponding projection of $P_{os}$ to $p_0$) shown in the more central portion of the figure. The diagonal dashed arrow indicates a central ray projection along the camera viewing axis. Notice that the separation of the span points $p_3$ and $p_4$ will not normally be equal to the separation of span points $p_1$ and $p_2$ as most drones are far from spherically symmetric, and the projected position $p_0$ may not lie at their mid points.

After the 2D image projection of the five points is established, a rectangular outline can be defined enclosing the points, as shown by the heavy dashed boundary in the right portion of the figure (not shown to scale with respect to the 2D image to its left in the figure).

The actual size of the enclosing rectangle, defining ROI 600, is normally scaled up from the minimum size that would encompass the points, to take timing, positioning and other uncertainties into account. Note that while the ROI may be completely contained within the boundaries of the captured image, suggested by the heavy outline 620, it may in some cases (not shown) extend beyond it, though of course in the same plane. This may be due to the second drone being very close to an image boundary, and possibly even straddling it. In fact the possibility of the ROI extending beyond the image boundaries confers an additional advantage to the present invention over prior art approaches as it reduces the possibility of "missing" the second drone if it is so close to the boundary that the cropped portion visible in the image is hard to recognize.

Figure 7:
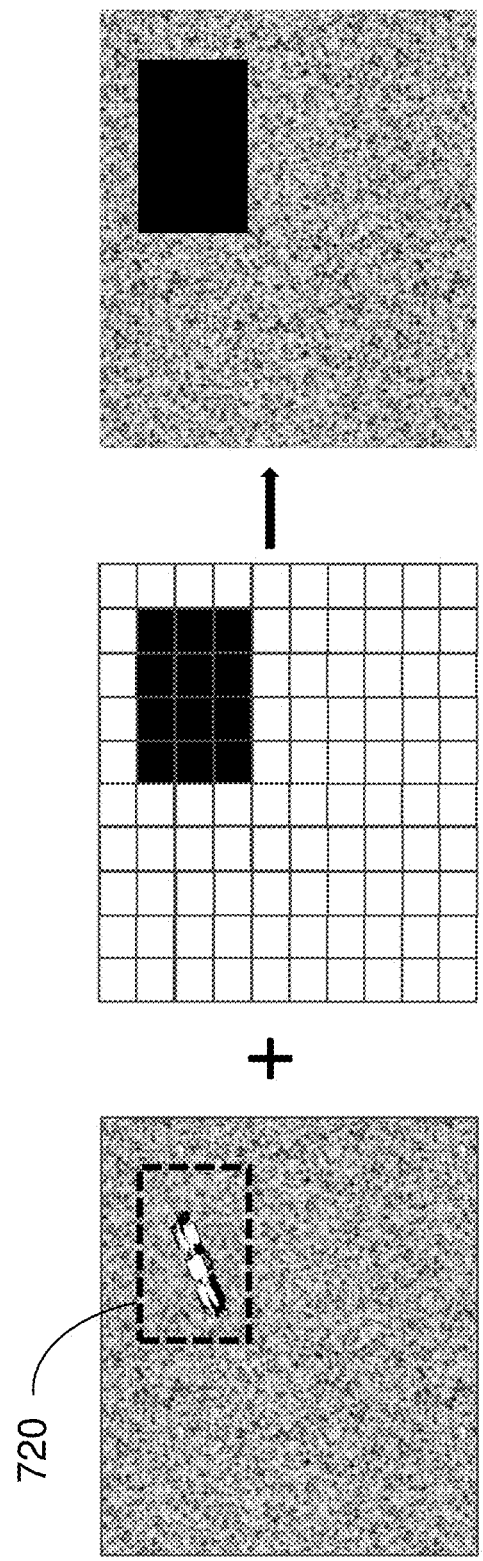
FIG. 7 illustrates mask generation and application according to one embodiment of the present invention.

Returning now to step 330 of method 300, a mask that is in some meaningful way representative of the second drone must be generated. The mask has width and height matching the width and height of the captured image. In the simplest case, any mask pixels at positions within the mask that match the positions of image pixels within the defined ROI will be set at or labeled with one value, such as zero, while all other mask pixels are labeled with another value, such as unity. FIG. 7 illustrates how applying such a mask, 700, to a corresponding captured image 710, in which ROI 720 has been defined, can "blank out" or remove the set of image pixels that include the extraneous content that may be ascribed to the second drone. This may be acceptable, depending on the application, in the light of the resources of time and computing power available. However, applying a simple rectangular mask of this type may also cause a significant amount of image content in nearby pixels, representative of the underlying scene itself, to be discarded too.

In some embodiments, a mask with more intricate features may be generated, using a detection system or detector that identifies a subset of pixels within the ROI as having high probability (relative to the other pixels in the ROI) of including content due to the presence of the second drone.

One such detection method would be to implement a rule-based method to do this, such as using some combination of the second drone's size, shape, color, motion dynamics, and/or additional information received from other sensors. Another would be to use a learning-based drone detector to classify pixels inside the ROI according to likelihood of belonging to a drone inside or not. This can be determined based on the image itself and the positional data for the second drone, more specifically the projected center location $P_0$ of that drone in the ROI—see ROI 600 in FIG. 6.

Figure 8:
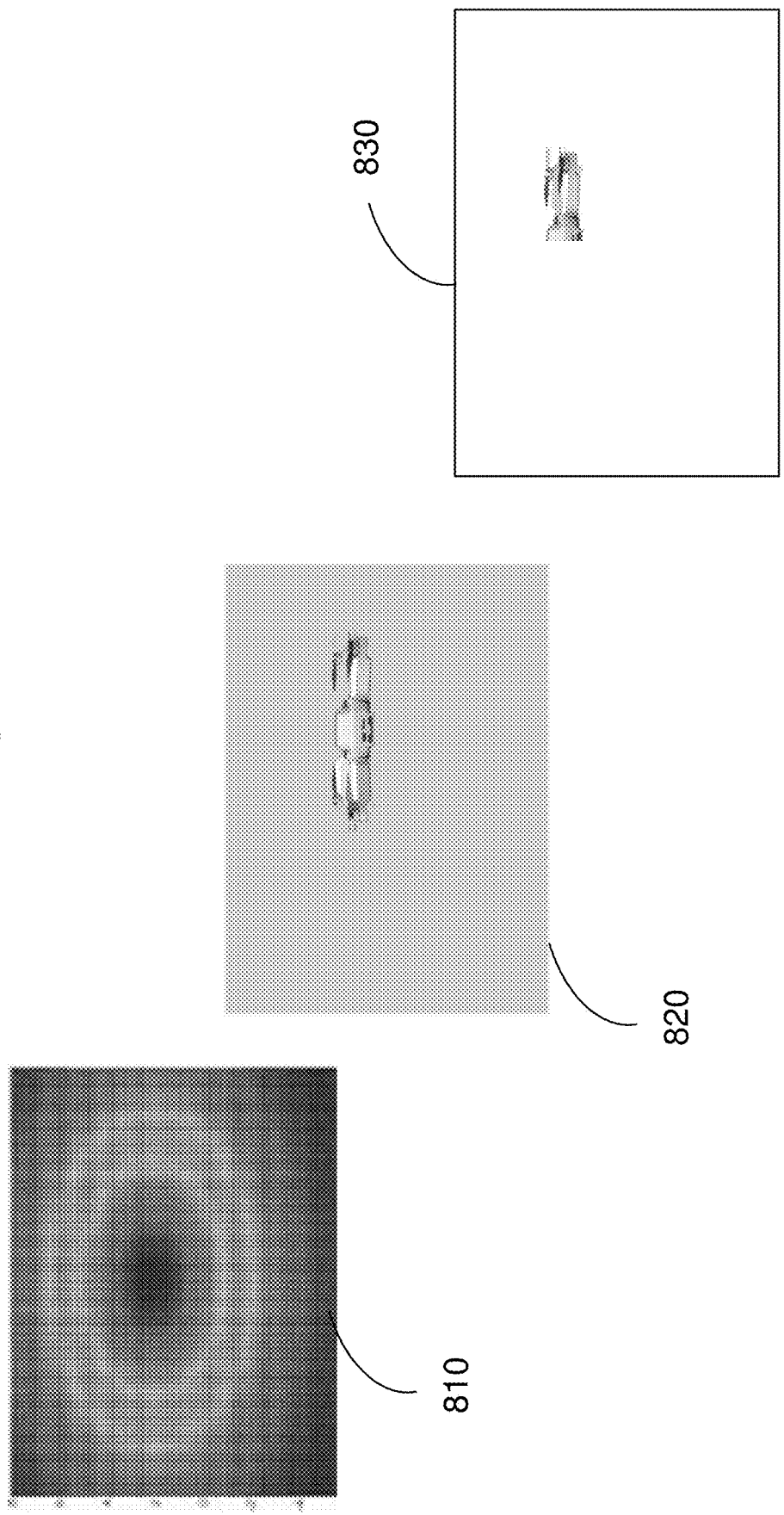
FIG. 8 illustrates a learning-based drone detection method according to some embodiments of the present invention.

One such learning-based detection method depends on preparing heat map input as well as visual captured-image input, and then using the combination to train the detector to recognize a drone shape. The heat map preparation depends on collecting a set of drone-captured images, defining ROI's as described above, but then manually annotating them with ground truth drone center positions. This allows error vectors and standard deviations of the positioning errors along x and y coordinate axes to be computed, and a heatmap image such as 810, on the top left of FIG. 8 to be generated. The visual images used in the heat-map preparation, such as 820 in the center of FIG. 8, may be augmented in ways well known in the art, to include variations such as cropped or partial-drone images, like 830 in FIG. 8, to improve the training set. The detector can then be trained by the resulting "4-channel" input images, where each visual image is represented by 3 channels (R-G-B) and the heat map data makes up the $4^{th}$ channel.

A detector trained in this way can subsequently be used to generate more finely detailed masks, which can be applied to newly captured (non-training) images to identify drone-related pixels and remove the corresponding visual content with improved accuracy and efficiency.

In applications such as those mentioned in the Background section of this invention, where the extraneous object to be removed is another person, for example, or a crane on which another camera is mounted, the training data for the detector should, of course, be changed accordingly so that an appropriately shaped mask may be generated and applied.

After the second drone position in 3D space has been estimated, the ROI defined around that position projected into the 2D image space, and the mask generated and applied, for each image captured by the first drone, the resulting masked images can be aligned and reconstructed to recreate the scene, in 2D or 3D forms. The essence of the process described above can of course also be carried out for images captured by the second drone that may include the first drone in its field of view, and in the most general case, each drone in a swarm containing a large number drones, operating over overlapping time periods to image a particular 3D scene, can use essentially the same process steps to remove content corresponding to any of the other drones in the swarm from their own set of captured images.

Methods for reconstructing the original scene from the processed (masked) images provided by the drone swarm are well known in the art, having been developed for applications in movies, TV, video games, AR/VR, or visual content editing software, which involve image alignment, point cloud generation, and mesh, texture, or other similar reconstruction models. The present invention therefore could be of great value in providing images free of extraneous visual content for all these applications. Another area of application would be to monitor actual drone or drone swarm positioning, using method 300 as a means of providing real time visual feedback on planned or expected trajectories.

Embodiments of the present invention provide many benefits. In particular, they allow for the use of multiple drones to capture images of a scene in a relatively short time, without the need for extremely accurate drone trajectory control, because each drone can quickly and efficiently carry out at least the first stages of a process to remove extraneous content from the images it captures, The invention also includes an improved method of generating and applying masks to carry out the later stages of the process, increasing the quality of the results of subsequent rebuild and reconstruction efforts.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for removing extraneous content in a first plurality of images, captured at a corresponding plurality of poses and a corresponding first plurality of times by a first drone, of a scene in which a second drone is present; the method comprising:
for each of the first plurality of captured images:
the first drone predicting a 3D position of the second drone at a time of capture of that image;
the first drone defining, in an image plane corresponding to that captured image, a region of interest (ROI) including a projection of the predicted 3D position of the second drone at a time of capture of that image;
generating a drone mask for the second drone by defining a shape encompassing at least some pixels within the ROI likely to contain visual content showing the second drone in a field of view of the first drone at a pose of the first drone at a time of capture of that image, the shape being defined as a subset of pixels of the ROI, the subset being determined by a learning-based drone detection model, trained using a combination of visual training data and heatmap training data, the heatmap training data having been generated using positional measurements, obtained by a non-visual sensor system, of the second drone, or another drone identical to the second drone; and
applying the generated drone mask to the defined ROI, to generate an output image free of extraneous content contributed by the second drone.

2. The method of claim 1, wherein predicting the 3D position of the second drone at a time of capture of that captured image comprises at least one of:
receiving time-stamped position data relating to the second drone; and
making use of a priori knowledge of a planned trajectory of the second drone.

3. The method of claim 2, wherein receiving time-stamped position data relating to the second drone comprises receiving a stream of time-stamped position data items transmitted by the second drone directly or indirectly to the first drone.

4. The method of claim 2, wherein predicting the 3D position of the second drone at a time of capture of that image comprises updating an estimate of the position of the second drone at that time of capture based on one or more items of a received stream of time-stamped position data items.

5. The method of claim 2, wherein the time-stamped position data relating to the second drone is generated at least in part by a 3D global positioning methodology.

6. The method of claim 1, wherein the first and second drones use a 5G communication protocol.

7. The method of claim 1, wherein defining, in an image plane corresponding to that captured image, a region of interest (ROI) including a projection of the predicted 3D position of the second drone at a time of capture of that image comprises:
using a pose of the first drone, determined at a time of capture of that image, to compute orientation of that captured image in a global 3D coordinate system;
using the determined pose of the first drone and predetermined dimensions of the second drone to calculate four maximal span points characterizing the second drone, in the global coordinate system;
projecting the four maximal span points and the predicted 3D position of the second drone onto the image plane corresponding to the captured image;
defining a rectangular box encompassing the projected four maximal span points and the predicted 3D position of the second drone in the image plane; and
expanding the rectangular box by a scaling factor to define the ROI, the scaling factor taking timing factors and measurement uncertainties into account.

8. The method of claim 1, wherein the non-visual sensor system is an RTK-GNSS-IMU system.

9. A method for removing extraneous content in a first plurality of images, captured at a corresponding plurality of poses and a corresponding first plurality of times by a first drone, of a scene in which a plurality of other drones is present; the method comprising:
for each of the first plurality of captured images:
the first drone predicting a 3D position of each of the other drones at a time of capture of that image;
the first drone defining, in an image plane corresponding to that captured image, a region of interest (ROI) for each of the other drones including a projection of the predicted 3D position of each of the other drones;
generating a drone mask for each of the other drones by defining a shape encompassing at least some pixels within the ROI likely to contain visual content showing that other drone in a field of view of the first drone at a pose of the first drone at a time of capture of that image, the shape being defined as a subset of pixels of the ROI, the subset being determined by a learning-based drone detection model, trained using a combination of visual training data and heatmap training data, the heatmap training data having been generated using positional measurements, obtained by a non-visual sensor system, of the second drone, or another drone identical to the second drone; and
applying the generated drone masks to the corresponding defined ROIs, to generate an output image of the scene, free of extraneous content contributed by the other drones.

10. An apparatus for removing extraneous content in a first plurality of images, captured at a corresponding plurality of poses and a corresponding first plurality of times by a first drone, of a scene in which a second drone is present; the apparatus comprising:
one or more processors; and
logic encoded in one or more non-transitory media for execution by the one or more processors and when executed operable to:
for each of the first plurality of captured images:
predict a 3D position of the second drone at a time of capture of that image;
define, in an image plane corresponding to that captured image, a region of interest (ROI) including a projection of the predicted 3D position of the second drone at a time of capture of that image;
generate a drone mask defined by a shape encompassing at least some pixels within the ROI likely to contain visual content showing the second drone in a field of view of the first drone at a pose of the first drone at a time of capture of that image, the shape being defined as a subset of pixels of the ROI, the subset being determined by a learning-based drone detection model, trained using a combination of visual training data and heatmap training data, the heatmap training data having been generated using positional measurements, obtained by a non-visual sensor system, of the second drone, or another drone identical to the second drone; and apply the generated drone mask to the defined ROI, to generate an output image of the scene, free of any extraneous content contributed by the second drone;

wherein the prediction and the defining are carried out by one or more of the one or more processors located within the first drone; and wherein the drone mask generation and application are at least partly carried out by one or more processors located remotely from the first drone.

11. The apparatus of claim 10, wherein the first drone receives time-stamped position data relating to the second drone, at least partly enabling the one or more processors located within the first drone to predict a position of the second drone at a time of capture of that captured image.

12. The apparatus of claim 11, wherein the one or more processors located within the first drone have access to a priori knowledge of a planned trajectory of the second drone, improving prediction of the position of the second drone at a time of capture of that captured image.

13. The apparatus of claim 11, wherein the time-stamped position data relating to the second drone is generated at least in part by a 3D global positioning methodology.

14. The apparatus of claim 11, wherein the time-stamped position data relating to the second drone comprises a stream of time-stamped position data items transmitted by the second drone directly or indirectly to the first drone.

15. The apparatus of claim 10, wherein the first drone comprises a global navigation satellite system (GNSS) receiver and an inertial measurement unit (IMU), operable to determine poses of the first drone at which the first plurality of images are captured are measured.

* * * * *